United States Patent [19]

Paradis

[11] Patent Number: 4,709,688
[45] Date of Patent: Dec. 1, 1987

[54] OPEN CELL SHEETING

[76] Inventor: Roger O. Paradis, 998 Terranova Drive, Orleans, Ontario, Canada, K1C 3K6

[21] Appl. No.: 843,582

[22] Filed: Mar. 25, 1986

[51] Int. Cl.$^4$ .................................................. F24J 3/02
[52] U.S. Cl. ....................................... 126/415; 126/416; 126/426; 4/498; 4/502; 428/178
[58] Field of Search ................. 126/416, 426, 415; 4/498–503; 428/178, 179, 180, 188

[56] References Cited

U.S. PATENT DOCUMENTS

| | | | |
|---|---|---|---|
| 997,994 | 7/1911 | Hahn | 428/179 |
| 3,484,835 | 12/1969 | Trounstine et al. | 428/179 |
| 3,949,095 | 4/1976 | Pelehach et al. | 126/426 X |
| 4,028,750 | 6/1977 | Gustafsson | 4/498 |
| 4,079,726 | 3/1978 | Voelker | 126/415 |
| 4,082,081 | 4/1978 | McColgan et al. | 126/415 |
| 4,146,015 | 3/1979 | Acker | 126/415 |
| 4,203,268 | 5/1980 | Gladden, Jr. et al. | 428/178 X |
| 4,256,087 | 3/1981 | Sowers | 126/415 |
| 4,344,536 | 8/1982 | Oberhuber | 428/178 X |
| 4,471,759 | 9/1984 | Anderson et al. | |

FOREIGN PATENT DOCUMENTS

| | | |
|---|---|---|
| 1171753 | 7/1984 | Canada. |
| 712134 | 11/1984 | Canada. |
| 2722613 | 12/1977 | Fed. Rep. of Germany. |

*Primary Examiner*—Larry Jones
*Attorney, Agent, or Firm*—David J. French

[57] ABSTRACT

A two-ply sheeting material is provided with open ended dimples formed in the lower layer that will trap air and ensure flotation when the sheeting is deployed on a swimming pool as a pool cover. The upper sheet is bonded to the tops of the dimples to form a thin planar cavity. When coupled to a water circulating system, the combined two-layer product can usefully perform both as a pool cover and as a solar absorber adapted to warm the water circulating therethrough.

17 Claims, 7 Drawing Figures

OPEN CELL SHEETING

FIELD OF THE INVENTION

This invention relates to a new form of sheeting. More particularly, it relates to a sheeting that is adapted for use as a covering for swimming pool surfaces, and the like, and may be adapted to form a solar energy absorber.

BACKGROUND OF THE INVENTION

It is known to construct sheeting material from laminated layers of plastic film, such as polyethylene or polyvinylchloride, having cells of air trapped inside. One application of such sheeting materials has been as coverings for swimming pools.

Examples of disclosures incorporating such structures are found in the following documents:
U.S. Pat. No. 3,072,920 to J. I. Yellott
U.S. Pat. No. 4,028,750 to Erik G. Gustafsson
U.S. Pat. No. 4,313,421 to John M. Trihey
U.S. Pat. No. 4,146,015 to Loren C. Acker
U.S. Pat. No. 4,197,595 to LeRoy M. Dearing
U.K. Appln. No. 2,025,602 to Allan William Taylor
FGR Offenlegungsschrift No. 2,212,413 to Franz Kerner
FGR Offenlegungsschrift No. 2,149,851 to Franz Kerner
Japanese No. 56-168061 to Kiyoshi Horie.

In all of the foregoing cases air is sealed in chambers within successive layers of sheeting.

It has also been proposed to improve the solar absorption of swimming pools by floating absorption chambers over the top surface of a pool and pumping water therethrough.

Covers of both classes are bulky to roll-up for purposes of storage. Because they are composed of multiple layers of sheeting bonded together, they require complicated fabrication techniques.

It is therefore an object of this invention to provide sheeting which may be more easily fabricated and has the feature of being more easily compressed for storage. It is a further feature of this invention to adapt the foregoing sheeting material to form a continuous chamber through which a liquid may be circulated as a means of absorbing solar energy.

SUMMARY OF THE INVENTION

According to this invention a new form of sheeting is provided which comprises a basic planar sheet of flexible, thermoplastic material having dimples formed therein.

By one feature of this invention such dimples are formed from the basic sheet material by stretching such material beyond its elastic limit to the point that plastic flow occurs and the dimples are thereby permanently formed therein.

In use, the dimpled sheet may be deployed over the surface of a pool with the open portions of the dimples facing downwardly. Air naturally trapped in the dimples will provide flotation. The presence of such a sheet on the upper surface of a swimming pool will serve to reduce evaporation, which is one of the major sources of heat loss from swimming pools.

Because the sheeting material is flexible, the dimples may be crushed easily when the sheeting is rolled up for storage, after removal from a pool. Such a dimpled sheeting will thereby form a more compact bundle when rolled-up than a sheet having sealed air chambers.

Materials suitable for use in such sheeting material are polyethylene and polyvinylchloride, and other polymer plastics that perform equivalently.

By a further feature of the invention a combined pool cover and solar absorption chamber is formed by bonding to the tops of the dimples of the basic sheet a further upper sheet of flexible thermoplastic material. The solar absorption chamber so formed therebetween may be used to receive circulating water while the unit floats on a pool surface. Again, trapped air in the dimples will provide flotation. The circulating water will absorb solar radiation and may then be deposited in the mass of water below by flowing out along the open ends of the cover. The use of such a pool cover with a circulating water system reduces the tendency for a layer of warm water to form at the surface of the pool, with all the attendant thermal losses.

By a further feature of the invention the inlets for water to enter the chamber are formed by attaching coupling plates to the upper sheet at points distant from the edges of the solar absorption chamber. Such coupling plates are adapted to detachably couple to a linear manifold pipe that may be placed across the central region of a pool cover placed over a noncircular pool. By reason of such central placement, the manifold pipe may conveniently be linear, and thus adapted to be rolled within the pool cover when it is removed from the pool.

These and further features of the invention will be better understood by a review of the description of the exemplary embodiment set forth next.

DESCRIPTION OF EXEMPLARY EMBODIMENTS

Figure 1:
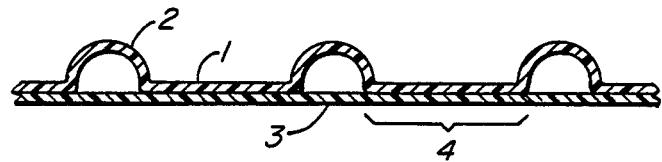
FIG. 1 shows a prior art sealed cell pool cover in crosssection.

FIG. 1 shows an example of a known covering material incorporating air in sealed chambers. An upper plastic sheet 1 has dimples 2 impressed therein. A lower plastic sheet 3 is bonded to the upper sheet 1 along a bonding region 4 between the dimples.

Figure 2:
FIG. 2 shows the cross-section of a sheeting according to the invention, with three variant dimple formations.

In FIG. 2 the basic form of the new sheeting material of the invention is depicted. The basic sheet 5 has dimples 6 impressed into it. By use of a suitable material for the basic sheet 5 such as polyethylene or polyvinylchloride, the dimples 6 are easily crushable. One dimple 7 is shown as partially crushed. It is desirable, however, that the material for the basic sheet, its gauge, and the shape of the dimple be such that the dimple resists total compression and tends to spring back, at least partially after release of a compressive force. A cylindrical dimple shape that has collapsed in an accordian-like fashion is shown as 7a in FIG. 2.

Figure 3:
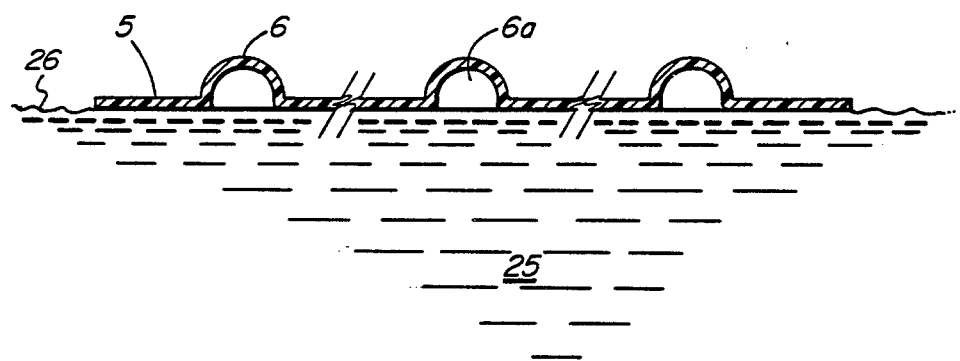
FIG. 3 shows a cross-section of a sheet as in FIG. 2 floating on the surface of a pool of water.

FIG. 3 shows the dimpled sheet 5 of FIG. 2 deployed on the upper surface 26 of a pool of water 25. The dimples 6 contain dimple cavities 6a of trapped air that provides flotation.

Figure 4:
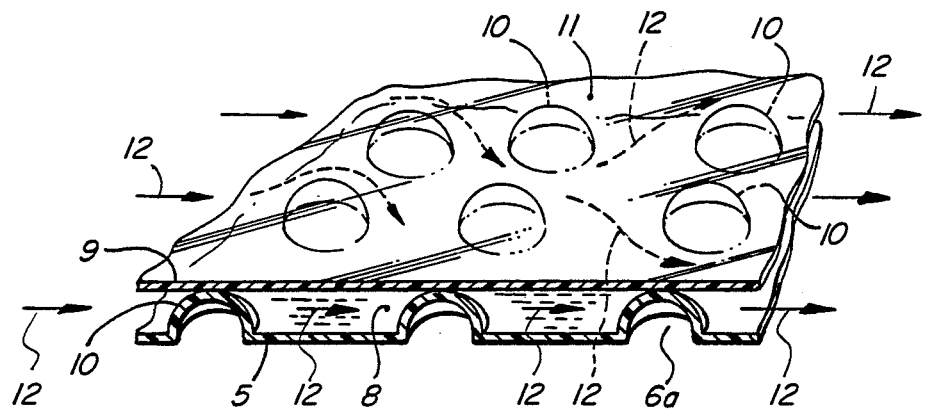
FIG. 4 shows a cross-section of a two layered solar absorber incorporating a sheet as in FIG. 2 as the lower layer.

In FIG. 4 the dimpled sheeting is shown adapted to serve as a solar absorber 11. Within the absorber 11 is an inner chamber 8 comprised of the cavity between the lower dimpled sheet 5 and an upper sheet 9 that is bonded to the lower dimpled sheet 5 at the tops 10 of the dimples 6. Bonding may be effected through use of appropriate adhesives or by thermal or radio-welding.

The solar absorber 11, so formed, may be fed with circulating water 12. When used on a swimming pool, the pool's existing water circulation system may be employed. The water circulation system provides a flow of water 12 through the chamber 8. To enhance solar absorption, the upper sheet 9 may be relatively transparent, and the lowered dimpled sheet 5 opaque.

The solar absorber 11, with air trapped in the dimple cavities 6a, will float on the upper surface of a pool even when filled with water 12 by reason of the fact that water is of neutral buoyancy. This same absorber 11 will also operate to provide a means for absorption of solar energy when deployed on a dry surface. Its utility is not, therefore, restricted to use as a floating swimming pool solar absorber.

Figure 5:
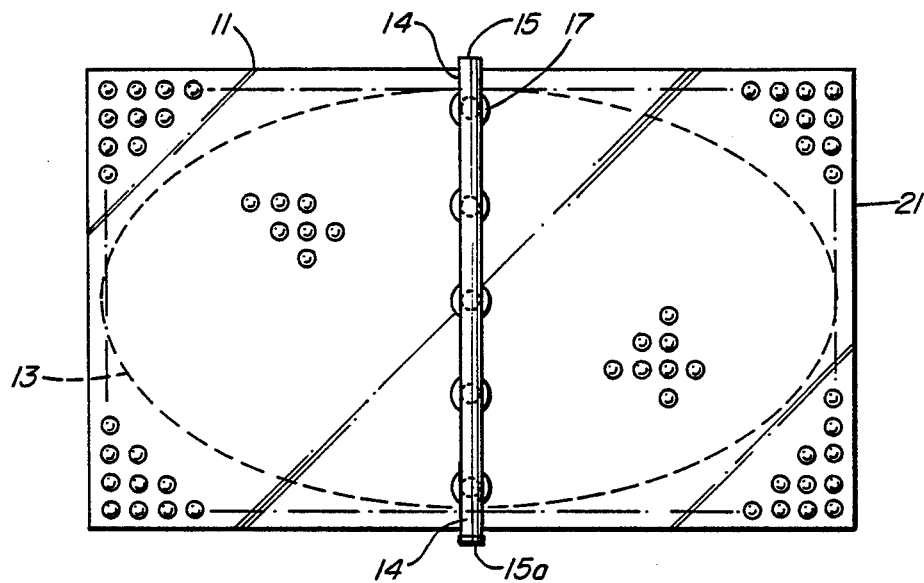
FIG. 5 is a downward looking view on a solar absorber pool cover laid over an elliptic pool, prior to being cut to fit.

In FIG. 5 a pool cover in the form of a solar absorber 11 is shown overlayed an elliptically shaped pool 13. A header or manifold in the form of a straight pipe 14 is attached to the pool cover 11 in its central region. Water enters the pipe 14 at an inlet 15 and then passes into the pool cover inner chamber 8 through a series of couplings 17 shown in detail in FIG. 6. The end of the header pipe 14 is capped at 15a.

Figure 6:
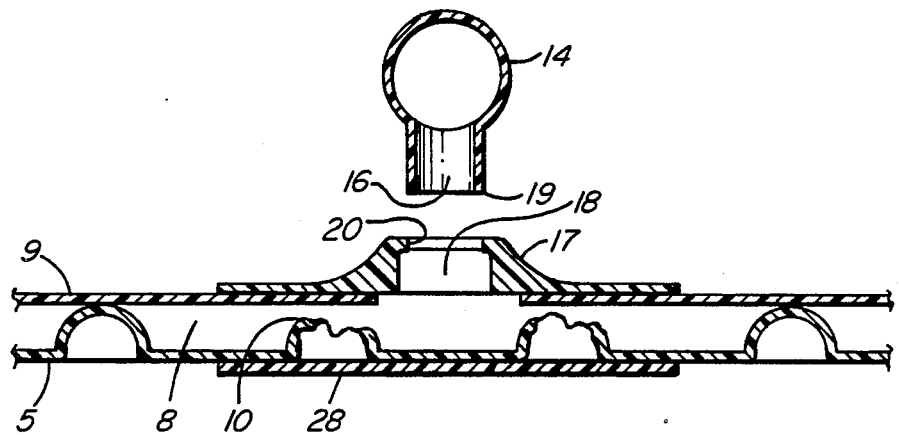
FIG. 6 is a cross-sectional view of a "T" junction in the header pipe as it is about to be fitted into a coupling ring on an absorber.

As shown in FIG. 6 the pipe 14 has a "T" joint that is equiped with a fluid injector passage 16. The upper sheet 9 has a reinforced coupling ring 17 bonded or welded through its upper surface, providing a coupling inlet 18. Where the tops 10 of any dimples 6 are cut-off to open the passage 18 into the inner chamber 8, or apply the coupling ring 17, a patch 28 is applied to the lower side of the lower dimpled sheet 5.

The ends 19 of the fluid injection passage 16 and the inner surface 20 of the coupling inlet 18 interfit in a tight, sealing but detachable manner. "O" rings and bayonnet-type coupling elements (not shown) may be incorporated to effect this coupling.

The outer edges 21 (shown in FIG. 5) of the solar absorber 11, when used as a pool cover, may be trimmed by cutting to fit the shape of the pool 13. Water entering the header pipe 14 may then flow through the inner chamber 8 and exit into the pool around the open outer edges 21.

A major advantage of a pool cover of the form described is that it may be easily fabricated in a continuous matter.

Figure 7:
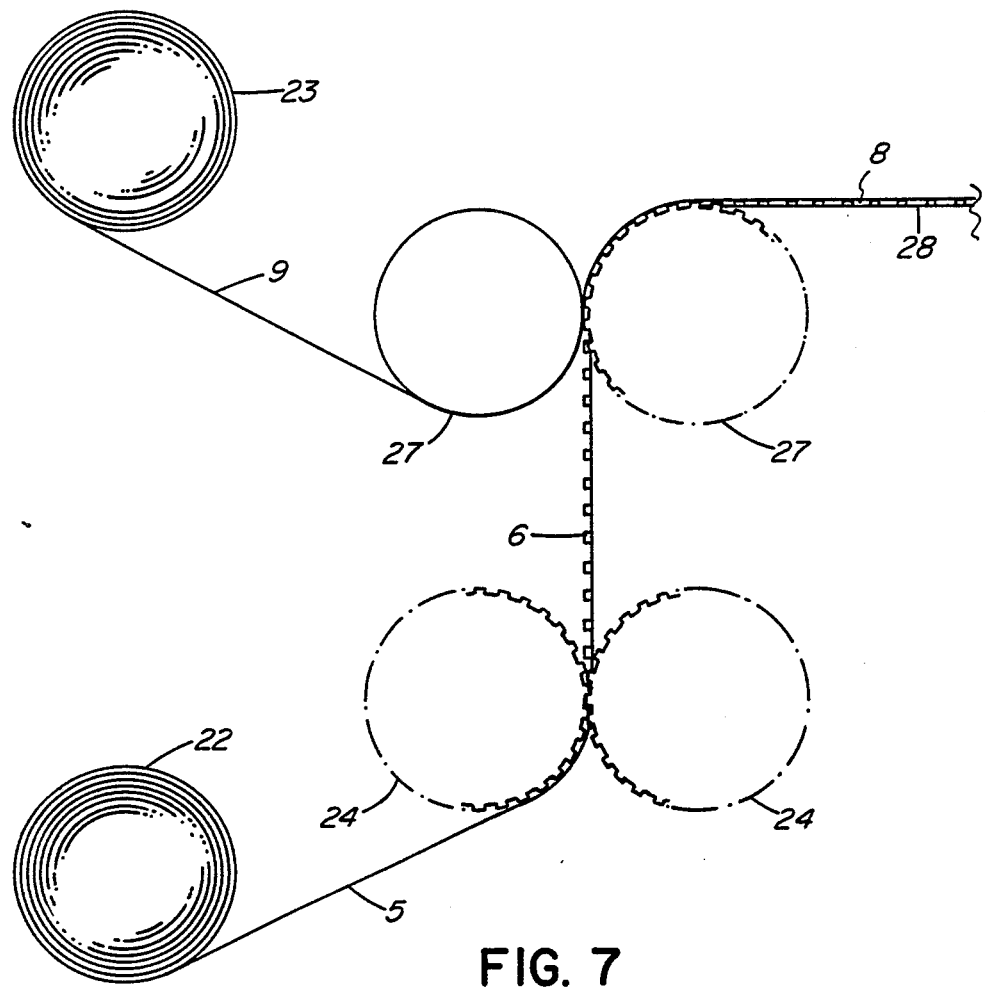
FIG. 7 depicts schematically the roll-forming of a solar absorber pool cover made according to the invention.

FIG. 7 shows two rolls of stock sheet 22, 23 being fed through two pairs of rollers. The base sheet 5 to be dimpled is fed through male and female forming rolls 24 that impress the dimples 6 into the base sheet 5.

The upper sheet 9 is then bonded, either thermally or by radio-welding, to the dimpled base sheet 5 by passing both sheets together through press and anvil laminating rolls 27. The finished pool cover 28 thereafter has one continuous inner chamber 8 but is completely free of any cavities containing sealed air.

Throughout much of this disclosure, the two-layer embodiment of the invention, which can serve as a combined pool cover and solar absorption chamber, has generally been referred to as a "solar absorption chamber", or "solar absorber". These latter designations should not be interpreted as restricting the use of this invention as part of a solar energy collection system. When utilized without water circulating therethrough, the two layer product will serve as a simple pool cover. In the "active" mode with water circulating therethrough, the cover serves both as a cover and as a solar absorber or solar absorption chamber.

The foregoing is a disclosure of exemplary embodiments of the invention. The invention is further described and defined in its broadest and more particular aspects in the claims which follow.

I claim:

1. A pool cover comprised of:
   (a) a lower sheet of flexible, thermoplastic material, said lower sheet having upwardly-displaced dimples protruding therefrom, said dimples having upper ends and being crushable and adapted to rebound elastically, and being further adapted to contain air and provide flotation when the cover is deployed on the surface of a pool; and
   (b) an upper sheet of flexible, thermoplastic material joined to said lower sheet at the upper ends of said protruding dimples.

2. A pool of water having deployed on its upper surface a pool cover as described in claim 1.

3. A pool cover as described in claim 2 wherein said upper and lower sheets are comprised of polyethylene.

4. A pool cover as described in claim 2 wherein said upper and lower sheets are comprised of polyvinylchloride.

5. A pool cover as described in claim 1 wherein said upper and lower sheets are comprised of polyethylene.

6. A pool cover as described in claim 1 wherein said upper and lower sheets are comprised of polyvinylchloride.

7. A pool cover as described in claim 1 wherein said upper sheet has a fluid inlet means formed therein.

8. A pool of water having deployed on its upper surface a pool cover as described in claim 7 wherein said upper and lower sheets are comprised of polyethylene.

9. A pool of water having deployed on its upper surface a pool cover as described in claim 7 wherein said upper and lower sheets are comprised of polyvinylchloride.

10. A pool of water having deployed on its upper surface a pool cover as described in claim 9 wherein said upper and lower sheets are comprised of polyvinylchloride.

11. A pool cover as described in claim 1 wherein said upper sheet has a plurality of fluid inlet means formed therein, across its central region.

12. A pool of water having deployed on its upper surface a pool cover as described in claim 11 wherein a linear header pipe is coupled to said inlet means, said header pipe substantially traversing the width of said pool cover.

13. A pool of water having deployed on its upper surface a pool cover as described in claim 12 wherein said upper and lower sheets are comprised of polyethylene.

14. A swimming pool comprising:
(a) a solar absorption chamber formed from upper and lower flexible plastic sheeting material bonded together at intervals by a series of dimples raised from the lower of said sheets of sheeting material, said dimples being open to the region below the absorption chamber, and being so formed on the lower sheet of said sheeting as to entrap air and provide buoyancy when the absorption chamber is deployed upon a pool surface;
(b) a manifold means for introducing pool water into said absorption chamber;
(c) exit means by which water introduced into said absorption chamber may be returned to a swimming pool after passage through said absorption chamber.

15. A swimming pool solar energy absorber as in claim 15 wherein said dimples are crushable and are capable of at least partial elastic rebound.

16. A pool cover comprised of first and second flexible thermoplastic sheeting material bonded together at intervals by a series of dimples raised from the surface of said first sheet, said raised dimples having upper ends joined to said second sheet and said dimples being open to the exterior on the side opposite said second side, and adapted to contain air when the cover is disposed on the surface of a pool with the open region of said dimples directed downwardly.

17. A pool cover as in claim 6 wherein said dimples are crushable and are capable of at least partial elastic rebound.

* * * * *